US012609227B2

(12) United States Patent
Wilber et al.

(10) Patent No.: US 12,609,227 B2
(45) Date of Patent: Apr. 21, 2026

(54) TEMPERATURE STABLE MAGNETOSTATIC WAVE RF DEVICES AND RELATED TECHNIQUES

(71) Applicant: Metamagnetics, Inc., Marlborough, MA (US)

(72) Inventors: William D. Wilber, Killingworth, CT (US); Taylor G. Trottier, Worcester, MA (US); Jacob G. Remz, Marlborough, MA (US); Scott M. Gillette, Norfolk, MA (US)

(73) Assignee: Metamagnetics, Inc., Marlborough, MA (US)

( * ) Notice: Subject to any disclaimer, the term of this patent is extended or adjusted under 35 U.S.C. 154(b) by 87 days.

(21) Appl. No.: 18/390,353

(22) Filed: Dec. 20, 2023

(65) Prior Publication Data

US 2024/0203623 A1 Jun. 20, 2024

Related U.S. Application Data

(60) Provisional application No. 63/476,178, filed on Dec. 20, 2022.

(51) Int. Cl.
*H01H 47/00* (2006.01)
*H01F 1/34* (2006.01)
*H01F 7/06* (2006.01)

(52) U.S. Cl.
CPC ............. *H01F 1/344* (2013.01); *H01F 7/064* (2013.01)

(58) Field of Classification Search
CPC ........................................................ H01F 1/344
See application file for complete search history.

(56) References Cited

U.S. PATENT DOCUMENTS 4,395,686 A * 7/1983 Adam .................... H03H 2/001 333/147
4,575,179 A * 3/1986 Lee .................... G02B 6/12004 365/10
5,017,896 A * 5/1991 Adam .................... H03H 2/001 333/156

(Continued)

OTHER PUBLICATIONS

Adam, "A Temperature Stabilized Magnetostatic Wave Device;" Proceedings of the 1979 International Microwave Symposium Digest; Jan. 1979; pp. 160-161; 2 Pages.

(Continued)

*Primary Examiner* — Stephen W Jackson
(74) *Attorney, Agent, or Firm* — Daly, Crowley, Mofford & Durkee, LLP

(57) ABSTRACT

Embodiments of the present disclosure relate to magnetostatic wave (MSW) radio frequency (RF) apparatuses, components thereof, and related techniques. In some embodiments, an MSW RF apparatus may be operated at a certain temperature. That temperature may be substantially stable over a range of ambient temperatures. In some embodiments, the substantially stable temperature may be provided by a temperature controllable enclosure, such as a mini-oven or thermoelectric cooler. In some embodiments, a MSW RF apparatus may include a ferrite through which electromagnetic energy is passed. In some embodiments, the ferrite may be doped to change its saturation magnetization. In some embodiments, a MSW RF apparatus may include a biasing magnet to apply a magnetic bias to the ferrite.

20 Claims, 6 Drawing Sheets

(56) References Cited

U.S. PATENT DOCUMENTS

| | | | | |
|---|---|---|---|---|
| 5,157,360 | A | 10/1992 | McGann et al. | |
| 5,517,161 | A * | 5/1996 | Andersson | H01P 1/218<br>333/202 |
| 6,232,850 | B1 | 5/2001 | Ikari et al. | |
| 6,998,929 | B1 * | 2/2006 | Adam | G01S 19/35<br>333/17.2 |
| 2023/0261654 | A1 * | 8/2023 | Mitsui | H02M 1/08<br>327/108 |

OTHER PUBLICATIONS

Adam et al., "MSW Frequency Selective Limiters at UHF;" Proceedings of the IEEE Transactions on Magnetics, vol. 40, No. 4; Jul. 2004; 3 Pages.

Kuki et al., "A Reflection Type of MSW Signal-to-Noise Enhancer in the 400-MHz Band;" Proceedings of the 1995 IEEE MTT-S International Microwave Symposium; Jan. 1995; pp. 111-114; 4 Pages.

Gall et al., "Influence of Ga-Substitution on the Megnetostatic Waves Properties in Garnet Films", IEEE Transactions on Magnetics, IEEE, vol. MAG-22, No. 5, Sep. 1986; 3 pages.

* cited by examiner

TEMPERATURE STABLE MAGNETOSTATIC WAVE RF DEVICES AND RELATED TECHNIQUES

CROSS REFERENCE TO RELATED APPLICATION

This application claims the benefit of priority to U.S. Provisional Application No. 63/476,178, filed on Dec. 20, 2022, which is hereby incorporated herein by reference in its entirety.

FEDERALLY SPONSORED RESEARCH

This invention was made with government support under N68335-17-C-0252, awarded by the U.S. Navy. The government has certain rights in the invention.

BACKGROUND

Ferrite-based magnetostatic wave (MSW) devices, such as frequency selective limiters (FSL), have a limited frequency of operation. Published reports show the lowest operational frequency of these devices to be about 400 MHz. Therefore, ferrite-based MSW devices may not perform as desired in the very high frequency (VHF) band (defined as the frequency range 30 MHz to 300 MHz) or the lower portions of the ultra high frequency (UHF) band (defined as the frequency range from 300 MHz to 3,000 MHz).

In one approach used to enable operation of MSW devices at lower frequencies (e.g., frequencies as low as 400 MHz), researchers have used ferrite materials with relatively low saturation magnetization values. For example, researchers have used yttrium iron garnet (YIG) with the chemical composition $Y_3Fe_5O_{12}$ in MSW devices. YIG has exceptionally low microwave loss, so its use can result in MSW devices with low insertion loss. It has been shown that high-quality YIG films can be grown by liquid phase epitaxy (LPE). The saturation magnetization of pure YIG is approximately 1780 gauss. For UHF MSW devices, researchers have used doped YIG where the saturation magnetization is as low as 800 gauss, which has resulted in MSW devices that can operate at a frequency as low as 400 MHz.

The performance of MSW devices is inherently temperature sensitive. For example, frequency of operation of MSW devices may shift by more than 2 MHz per 1° C. change in temperature. This temperature sensitivity will result in performance variation in applications where the ambient temperature does not remain constant.

MSW devices use a magnetic bias field. Temperature compensation techniques have been used that cause an applied magnetic bias field in MSW devices to vary with temperature, such that the resulting operational frequency is relatively stable. A technique for temperature compensating a magnetic field using magnetic shunts has been used in some microwave circulators. A similar temperature-compensation technique using shunts has been described for MSW devices to enable operation of MSW devices at lower frequencies (e.g., frequencies approaching or as low as 400 MHz).

Still another technique to enable operation of MSW devices at lower frequencies (e.g., frequencies approaching or as low as 400 MHz) is to use two different materials for a magnetic biasing structure such that the resulting field produces an operating frequency that is relatively stable over temperature.

U.S. Pat. No. 6,232,850, describes a method for stabilizing the frequency of a MSW device over temperature. The method uses an off-angle substrate on which a "garnet" magnetic film is grown, applies the magnetic field at a specific angle, and orients transducers at a specific angle.

SUMMARY

Embodiments of the present disclosure relate to magnetostatic wave (MSW) radio frequency (RF) apparatuses, components thereof, and related techniques. In some embodiments, a MSW RF apparatus may be operated at a certain temperature. That temperature may be substantially stable over a range of ambient temperatures. In some embodiments, the substantially stable temperature may be provided by a temperature controllable enclosure, such as a mini-oven or thermoelectric cooler. In some embodiments, a MSW RF apparatus may include a ferrite through which electromagnetic energy is passed. In some embodiments, the ferrite may be doped to change its saturation magnetization characteristic. In some embodiments, a MSW RF apparatus may include a biasing magnet to apply a magnetic bias to the ferrite.

In accordance with some embodiments, there is provided a magnetostatic wave (MSW) radio frequency (RF) apparatus. The MSW RF apparatus may comprise a MSW device. The MSW device may comprise a ferrite having a saturation magnetization characteristic and a pair of RF transducers that couple electromagnetic energy into and out of the ferrite. The MSW RF apparatus may further comprise a biasing magnet. The biasing magnet may be disposed to apply a magnetic bias to the ferrite for propagation of magnetostatic surface waves (MSSW), forward volume magnetostatic waves (FVMSW), backward volume magnetostatic waves (BVMSW), or a combination thereof. The MSW RF apparatus may still further comprise a temperature controllable enclosure used to apply a temperature, thereby changing the saturation magnetization characteristic of the ferrite and an associated operating frequency of the MSW RF apparatus.

In some embodiments, the ferrite may comprise a chemically applied dopant and the dopant may be of a sufficient amount to change the saturation magnetization characteristic of the ferrite. In further embodiments, the ferrite may comprise yttrium iron garnet (YIG). In still further embodiments, the dopant may comprise at least one of calcium, vanadium, or aluminum, and the dopant may be of a sufficient amount to change the saturation magnetization characteristic of the ferrite. In some embodiments, the dopant may comprise gadolinium. In further embodiments, the temperature controllable enclosure may be configured to increase temperature from an ambient temperature, thereby lowering a saturation magnetization characteristic of the ferrite and lowering an associated operating frequency of the MSW RF apparatus. In still further embodiments, the temperature controllable enclosure may be configured to decrease temperature from an ambient temperature, thereby raising a saturation magnetization characteristic of the ferrite and raising an associated operating frequency of the MSW RF apparatus.

In some embodiments, the MSW RF apparatus may be configured to function as at least one of: a frequency selective limiter (FSL); a signal-to-noise enhancer (SNE); a delay line; a bandpass filter; a bandstop filter; or an isolator. In further embodiments, the temperature controllable enclosure may be configured to provide a constant temperature over a range of ambient temperatures. In still further embodiments, the biasing magnet may remain at a substantially constant temperature and provide a substantially constant magnetic bias field over a range of ambient temperatures. In some embodiments, the biasing magnet may be disposed inside the temperature controllable enclosure. In further embodiments, the biasing magnet may be disposed outside the temperature controllable enclosure. In still further embodiments, the biasing magnet may be disposed on one or more surfaces of the temperature controllable enclosure. In some embodiments, the temperature controllable enclosure may comprise a mini-oven. In further embodiments, the temperature controllable enclosure may comprise a thermoelectric cooler.

Furthermore, in accordance with some embodiments, there is provided a magnetostatic wave (MSW) radio frequency (RF) apparatus. The MSW RF apparatus may comprise a MSW device. The MSW device may comprise a ferrite having a saturation magnetization characteristic and a pair of RF transducers that couple electromagnetic energy into and out of the ferrite. The MSW RF apparatus may further comprise a biasing magnet. The biasing magnet may be disposed to apply a magnetic bias to the ferrite for propagation of magnetostatic surface waves (MSSW), forward volume magnetostatic waves (FVMSW), backward volume magnetostatic waves (BVMSW), or a combination thereof. The MSW RF apparatus may still further comprise a temperature controllable enclosure used to increase temperature from an ambient temperature, thereby changing the saturation magnetization characteristic of the ferrite and an associated operating frequency of the MSW RF apparatus.

In some embodiments, the ferrite may comprise yttrium iron garnet (YIG). In further embodiments, the ferrite may comprise a chemically applied dopant, wherein the dopant is of a sufficient amount to change the reduce the saturation magnetization characteristic of the ferrite, and wherein the dopant comprises at least one of calcium, vanadium, gadolinium, or aluminum. In still further embodiments, the MSW RF apparatus may operate at frequencies of about 225 MHz to about 400 MHz. In some embodiments, the temperature controllable enclosure may comprise a mini-oven.

Before explaining example embodiments consistent with the present disclosure in detail, it is to be understood that the disclosure is not limited in its application to the details of constructions and to the arrangements set forth in the following description or illustrated in the drawings. The disclosure is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principles of the concepts described herein. Like reference numerals may designate corresponding parts throughout the different views. Furthermore, embodiments are illustrated by way of example and not limitation in the figures.

FIG. 1(*b*) is a top view of an example printed circuit board (PCB1) with components mounted thereon, in accordance with some embodiments.

DETAILED DESCRIPTION

Figure 1A:
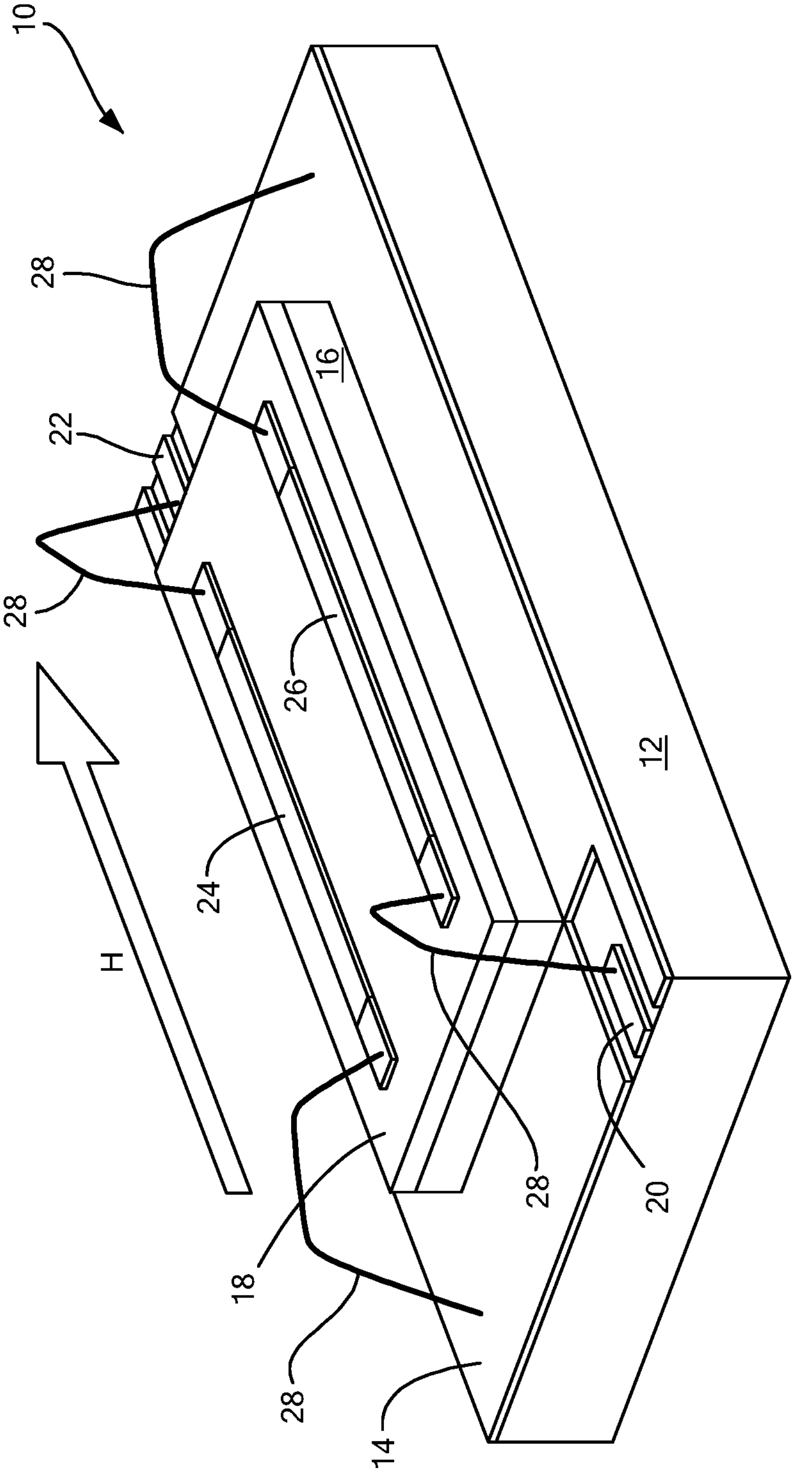
FIG. 1(*a*) is an isometric view of an example magnetostatic (MSW) device, in accordance with some embodiments.

Reference will now be made in detail to the embodiments of the disclosure, certain examples of which are illustrated in the accompanying drawings.

In the following description, numerous specific details are set forth regarding the techniques, apparatuses, materials, components, and devices of the disclosed subject matter, and the environment in which such techniques, apparatuses, materials, components, and devices operate, to provide a thorough understanding of the disclosed subject matter. After reading the descriptions provided herein, it will be apparent to one skilled in the art, however, that the disclosed subject matter may be practiced without such specific details. It will also be apparent to one skilled in the art that certain features, which are well known in the art, are not described in detail to avoid unnecessary complication of the description of the techniques, apparatuses, materials, components, and devices described herein. In addition, it will be understood that the embodiments provided below are exemplary, and that it is contemplated that there are other techniques, apparatuses, materials, components, and devices that are within the scope of the subject matter disclosed herein.

Embodiments of the present disclosure relate to magnetostatic wave (MSW) radio frequency (RF) apparatuses, components thereof, and related techniques. In some embodiments, a MSW RF apparatus may be operated at a certain temperature. That temperature may be substantially stable over a range of ambient temperatures. In some embodiments, the substantially stable temperature may be provided by a temperature controllable enclosure, such as a mini-oven or thermoelectric cooler. In some embodiments, a MSW RF apparatus may include a ferrite through which electromagnetic energy is passed. In some embodiments, the ferrite may be doped to change its saturation magnetization characteristic. In some embodiments, a MSW RF apparatus may include a biasing magnet to apply a magnetic bias to the ferrite.

Ferrite-based magnetostatic wave (MSW) devices, such as frequency selective limiters (FSL), have a limited frequency of operation. Published reports show the lowest operational frequency of these devices to be about 400 MHz. Therefore, ferrite-based MSW devices may not perform as desired in the very high frequency (VHF) band (defined as the frequency range 30 MHz to 300 MHz) or the lower portions of the ultra high frequency (UHF) band (defined as the frequency range from 300 MHz to 3,000 MHz).

In one approach used to enable operation of MSW devices at lower frequencies (e.g., frequencies as low as 400 MHz), ferrite materials with relatively low saturation magnetization values are included in the MSW devices. For example, researchers have used yttrium iron garnet (YIG) with the chemical composition $Y_3Fe_5O_{12}$ in MSW devices. YIG has exceptionally low microwave loss, so its use can result in MSW devices with low insertion loss. It has been shown that high-quality YIG films can be grown by liquid phase epitaxy (LPE). The saturation magnetization characteristic of pure YIG is approximately 1780 gauss. For UHF MSW devices, doped YIG has been used where the saturation magnetization characteristic is as low as 800 gauss, which has resulted in MSW devices that can operate at a frequency as low as 400 MHz.

The performance of MSW devices is inherently temperature sensitive. This temperature sensitivity will result in performance variation in applications where the ambient temperature does not remain constant MSW devices use a magnetic bias field. Temperature compensation techniques have been used that cause an applied magnetic bias field in MSW devices to vary with temperature, such that the resulting operational frequency is relatively stable. A technique for temperature compensating a magnetic field using magnetic shunts has been used in some microwave circulators. A similar temperature-compensation technique using shunts has been described for MSW devices to enable operation of MSW devices at lower frequencies (e.g., frequencies approaching or as low as 400 MHz).

Still another technique to enable operation of MSW devices at lower frequencies (e.g., frequencies approaching or as low as 400 MHz) is to use two different materials for a magnetic biasing structure such that the resulting field produces an operating frequency that is relatively stable over temperature.

The term "magnetostatic wave (MSW) radio frequency (RF) apparatus," as used herein, refers to a combination of elements that includes at least a ferrite-based MSW device, a biasing magnet, and a temperature controllable enclosure, as described herein.

Embodiments of the present disclosure encompass techniques, apparatuses, materials, components, and devices that can address the problems with conventional approaches to providing a MSW device. More particularly, and without limitation, the present disclosure relates to techniques, apparatuses, materials, components, and devices for providing a MSW RF apparatus that may be operated at a certain temperature. That temperature may be substantially stable over a range of ambient temperatures. In some embodiments, the substantially stable temperature may be provided by a temperature controllable enclosure, such as a mini-oven or thermoelectric cooler. In some embodiments, the MSW RF apparatus may include MSW device with a ferrite through which electromagnetic energy is passed. In some embodiments, the ferrite may be doped to change its saturation magnetization. In some embodiments, the MSW RF apparatus may include a biasing magnet to apply a magnetic bias to the ferrite. In some embodiments, disclosed herein, doping the ferrite of the MSW RF apparatus and controlling the temperature applied to the MSW RF apparatus may act to adjust a saturation magnetization characteristic of the ferrite such that different operating frequencies of the MSW RF apparatus may be achieved. In some embodiments, through use of doping of the ferrite and control of an applied temperature through the temperature controllable enclosure, MSW RF apparatuses (e.g., a frequency selective limiter (FSL)) may be capable of operation in the very high frequency (VHF) and lower portions of the ultra high frequency (UHF) bands. For example, MSW RF apparatuses that are stabilized by the use of a temperature controllable enclosure (e.g., an oven or mini-oven) may be provided.

In accordance with some embodiments, techniques, apparatuses, materials, components, and devices are provided that may utilize a low magnetization ferrite and miniature oven, used together, to provide for MSW RF apparatuses that operate in the VHF/UHF frequency range and that are thermally stable, even with changes to an external environment. The described techniques, apparatuses, materials, components, and devices are applicable to a wide range of MSW RF analog signal processing technologies, such as frequency selective limiters (FSL), signal-to-noise enhancers (SNE), delay lines, bandpass filters, bandstop filters, isolators, and combinations thereof.

In some embodiments disclosed herein, a ferrite having a particular magnetization saturation characteristic may be used with a temperature controllable enclosure to change an operating frequency of a MSW RF apparatus. For example, a ferrite having a low saturation magnetization may be used with a miniature oven to produce a MSW RF apparatus that operates in a particular low frequency range. In some embodiments, the ferrite may also be chemically doped to further reduce its saturation magnetization. For example, a doped ferrite having a low saturation magnetization may be used with a miniature oven to produce a VHF/UHF MSW RF apparatus (e.g., frequency selective limiter (FSL)) that operates in a frequency range of about 225 MHz to about 400 MHz. The MSW RF apparatus may be a FSL device that selectively attenuates strong signals (interferers) that are above a power threshold determined by the FSL design. The low saturation magnetization ferrite for such an embodiment may be provided from a properly synthesized garnet doped to reduce saturation magnetization. For example, in some embodiments, a MSW FSL apparatus capable of operation in a frequency range of about 225 MHz to about 400 MHz may utilize a ferrite comprising yttrium iron garnet (YIG) (e.g., $Y_3Fe_5O_{12}$) and doped with calcium, vanadium, aluminum, or gadolinium to reduce the saturation magnetization from 1780 gauss to approximately 500 gauss. MSW devices built with a 500 gauss doped YIG ferrite and operated at room temperature may be able to function at frequencies as low as approximately 350 MHz with relatively weak applied bias fields, for example, bias fields in the range of 20 to 40 Oersteds.

In order to further modify the operating frequency of such MSW RF apparatuses, the ferrite may be temperature controlled. For example, the operating frequency of the above example MSW FSL may be further lowered by heating the ferrite with a temperature controllable enclosure. Heating such a MSW FSL to a temperature range of about 55° C. to about 70° C. makes an operating frequency range of 225 MHz-400 MHz possible. In some embodiments devices may be heated using a temperature controllable enclosure, such as a miniature, temperature-controlled oven (mini oven). This conveniently affords a compact, temperature-stable MSW RF apparatus. Moreover, use of this technique enables operation in a lower frequency range without needing to custom design particular elements (e.g., temperature controller or mechanical package) of the MSW RF apparatus, such as a custom MSW device or integrated circuit. Rather, an existing device using the proper ferrite can be used in the desired frequency range through use of the temperature controlled enclosure.

At least some example advantages of the techniques, apparatuses, materials, components, and devices described herein include, but are not limited to: (1) an ability to adjust an operating frequency of a MSW RF apparatus by adjusting a temperature of the ferrite, and (2) an ability to keep a ferrite at a constant temperature so that a frequency of operation of a MSW RF apparatus does not vary in response to variations in an ambient temperature or variations in other environmental conditions (e.g. external to an environment of an enclosure in which at a ferrite is disposed).

Another example advantage is that using a temperature controllable enclosure to adjust a temperature of the ferrite lessens the restrictions on the choice of ferrite material. That is, a wider range of ferrite materials may be used to provide the MSW RF apparatus (e.g., wider than the range of ferrite materials in conventional MSW devices).

In accordance with the embodiments disclosed herein, a ferrite material with a particular saturation magnetization characteristic may be selected to operate a MSW RF apparatus in a desired frequency range. For example, a doped YIG ferrite film with a saturation magnetization of less than 500 gauss (a pure YIG ferrite has a saturation magnetization of about 1780 gauss) may be selected to operate a MSW RF apparatus near 300 MHz at room temperature. In some embodiments, the YIG ferrite film may be doped with calcium, vanadium, gadolinium, and/or aluminum. However, in selecting to use such a doped ferrite, the bandwidth of the frequency band in which the MSW RF apparatus operates may decrease. That is, the bandwidth of the frequency range in which a MSW RF apparatus may operate may decrease as the saturation magnetization of the ferrite in the MSW RF apparatus decreases. However, elevating the temperature of the ferrite may increase the bandwidth in which the MSW RF apparatus can operate, such that the bandwidth is again acceptable. For example, elevating the temperature of a YIG ferrite film with a saturation magnetization of 500 gauss may allow for an acceptable bandwidth to be maintained for a MSW RF apparatus.

While some of the above examples describe utilizing particular types of doped ferrites, and heating the ferrites with a temperature controllable enclosure to reduce an operating frequency of a MSW RF apparatus, the disclosure is not so limited. For example, other dopants may be used to dope a ferrite and raise an operating frequency of a MSW device. Moreover, a temperature controllable enclosure, such as a thermoelectric cooler, may be used to reduce the temperature of the ferrite, further increasing the operating frequency of the MSW apparatus. Thus, one would recognize that, through choice of an appropriate ferrite and an appropriate applied temperature, a MSW RF apparatus may be tuned to operate at a variety of different frequency ranges. As a result, use of the techniques disclosed herein can enable use of MSW RF apparatuses at a variety of different frequencies for a variety of different types of applications.

Use of the techniques disclosed herein to apply a chosen temperature of operation for a MSW RF apparatus may also allow a designer of the MSW RF apparatus more freedom in selecting from material thicknesses and properties. For example, use of a temperature controllable enclosure to apply a particular temperature may lessen restrictions on a thickness to select for the ferrite material. Thin ferrite films, relative to thicker films, become magnetically saturated at lower magnetic bias fields, and lower magnetic bias fields allow for lower operating frequencies. However, thinner ferrite films also result in lower power thresholds which may or may not be desired. Use of thinner films may also increase parameters such as dispersion and insertion loss, which may be undesirable. Elevating the temperature of operation may allow a designer to use thicker films and thereby optimize the power threshold and insertion loss.

By contrast, reducing the temperature of operation with a temperature controllable enclosure (e.g., a thermoelectric cooler) may allow designers to use thinner films.

Through selection of a ferrite material and temperature of operation, a designer may design MSW RF apparatuses with ferrite films that range in thickness from 0.5 μm up to 100 μm, for example.

A temperature controllable MSW RF apparatus, as described in embodiments herein, solves a conventional problem in making any MSW device, such as an FSL, acceptable in applications where the ambient temperature is not substantially constant. FSLs are often used to address strong interference signals encountered by military and other non-military systems, and those systems are most often deployed in the field (e.g., in ground systems, airborne systems, or shipboard systems). As a result, FSLs used in these systems may very well experience wide fluctuations in ambient temperature. For example, a specified temperature range for military grade components may be quite wide (e.g., −55° C. to +125° C.). While some specific examples disclosed herein are heated only to 70° C., the same techniques, apparatuses, materials, components, and devices described herein may be used to stabilize the temperature of the MSW RF apparatus above 125° C., if needed. Even commercial applications may have a temperature stability requirement that could prevent non-temperature-stable MSW devices from being accepted. For example, equipment for outdoor cellular applications may be required to meet specifications over a temperature range of about −40° C. to about +65° C.

In some embodiments, a MSW RF apparatus capable of operating at VHF and UHF frequencies may include: a magnetostatic wave (MSW) device comprising a ferrite having a saturation magnetization characteristic and a pair of RF transducers that couple electromagnetic energy into and out of the ferrite; a static magnetic bias applied to the ferrite that is configured for magnetostatic surface waves (MSSW), forward volume magnetostatic waves (FVMSW), backward volume magnetostatic waves (BVMSW), or a combination thereof; and a temperature controllable enclosure configured to be controlled to adjust a temperature of the device from an ambient temperature, thereby adjusting a saturation magnetization characteristic of the ferrite and an associated operating frequency of the device.

In some embodiments, a MSW RF apparatus may be configured to function as one or more of: a frequency selective limiter (FSL), signal-to-noise enhancer (SNE), delay line, bandpass filter, bandstop filter, isolators, or combination thereof.

In some embodiments, a MSW RF apparatus may be provided having a temperature controllable enclosure for controlling temperature (e.g., heating or cooling), to provide the MSW RF apparatus with one or more frequency response characteristics that are stable and controllable over a range of ambient temperatures.

In some embodiments, the MSW RF apparatus may include one or more biasing magnets disposed in, on, outside of, or about the temperature controllable enclosure, such that the one more biasing magnets remain at a substantially constant temperature and provide a substantially constant magnetic bias field.

Described herein with reference to the figures are techniques, apparatuses, materials, components, and devices related to use of ferrites and temperature controllable enclosures to provide MSW RF apparatuses that operate in a variety of different frequency ranges. For example, a ferrite with a low saturation magnetization (e.g., a doped YIG ferrite) may be used with a temperature controllable enclosure (e.g., miniature oven) to provide a MSW RF apparatus that operates in the VHF/UHF frequency range and that is thermally stable to the environment.

Before describing details of techniques, apparatuses, materials, components, and devices with respect to the figures, it should be appreciated that reference may sometimes be made herein to specific ferrite materials, MSW devices and/or RF components, circuits or systems. It should be appreciated that such references are solely made for purposes of clarity in describing the broad concepts sought to be protected and such references are not intended as, and should not be construed as, limiting. Rather, it should be appreciated that the techniques, apparatuses, materials, components, and devices described herein may be applicable to a wide range of MSW RF analog signal processing component technologies, including but not limited to frequency selective limiters (FSL), signal-to-noise enhancers (SNE), delay lines, bandpass filters, bandstop filters, isolators, and combinations thereof.

Figure 1B:
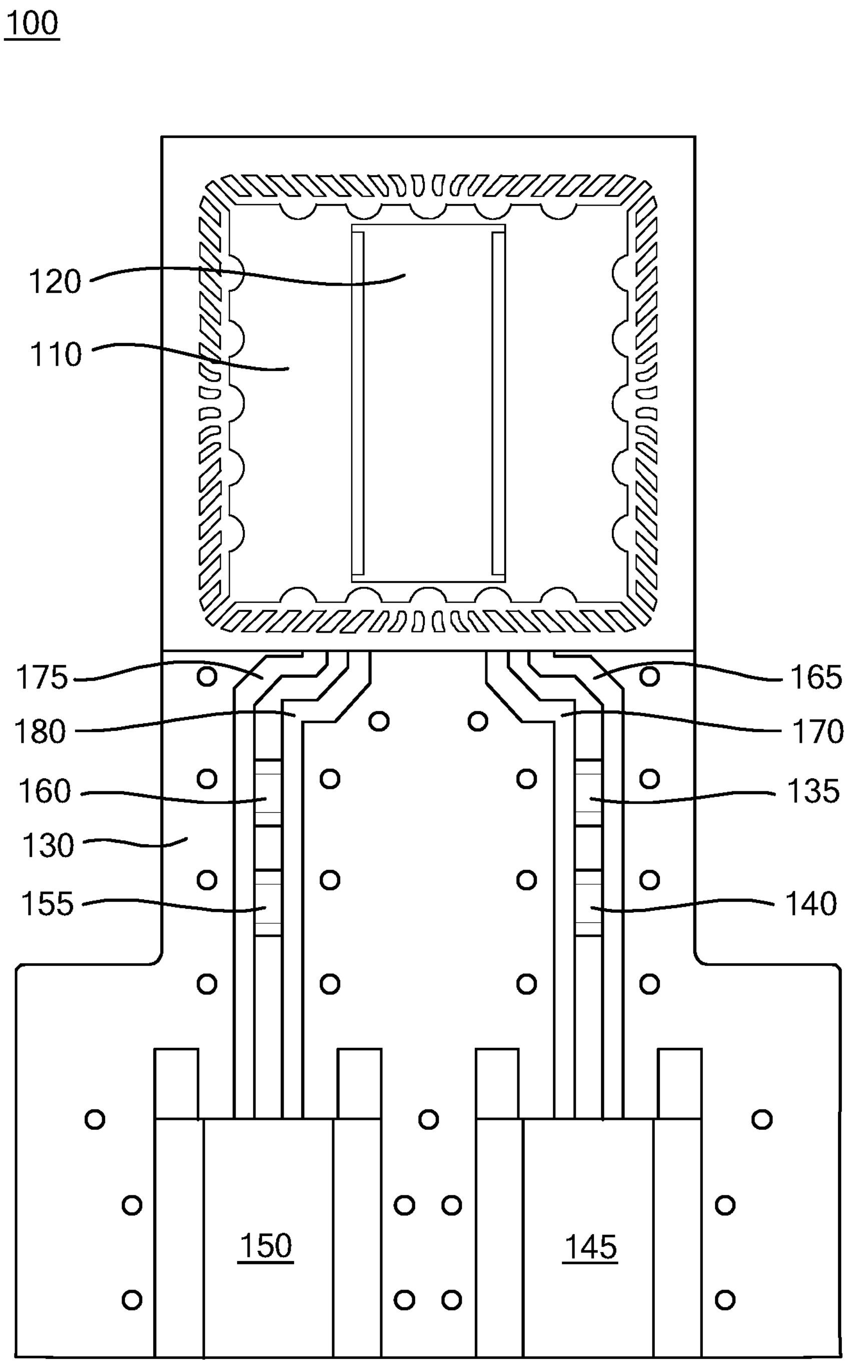

FIG. 1(*a*) is an isometric view of an example MSW device 10, consistent with embodiments of the present disclosure. In some embodiments, MSW device 10 may be a magnetostatic wave (MSSW) filter. In some embodiments, MSW device 10 may be a frequency selective limiter (FSL). MSW device 10 may include a substrate 12. For example, substrate 12 may be a monolithic microwave integrated circuit (MMIC) having a ground plane 14 disposed on a first surface thereof. A layer 16 may be disposed over ground plane 14. In some embodiments, layer 16 may comprise a Gadolinium Gallium Garnet (GGG) layer. Substrate 12 may be any substrate to which other components of MSW device 10 may be mounted. In some embodiments, substrate 12 may be a dielectric, magnetic, semiconductor substrate.

MSW device 10 may include a layer of ferrite material 18 disposed over layer 16. For example, ferrite material 18 may comprise YIG. In some embodiments, ferrite material 18 may comprise YIG and may be disposed over a layer (e.g., layer 16) of GGG. In some embodiments, RF transmission lines may be disposed on a surface of substrate 12 and may serve as ports 20, 22 (e.g., ports 20, 22 may be RF input and output ports) of MSW device 10. The RF transmission lines may be provided as coplanar waveguide, microstrip, stripline, or any other type of microwave transmission line. It should be appreciated that, depending on the type of MSW device 10 being designed, both reciprocal or non-reciprocal wave propagation may be supported. Also, depending on the type of MSW device 10, a bias field may be used to switch a direction of non-reciprocity, such that either of ports 20 or 22 may serve as an input port or an output port.

In some embodiments, MSW device 10 may include a pair of RF transducers 24, 26. RF transducers 24, 26 may be disposed over the layer of ferrite material 18 (e.g., YIG later). In some embodiments, RF transducers 24, 26 may be deposited on top of the layer of ferrite material 18 (e.g., by using photolithography). In some embodiments, RF transducers 24, 26 may be wires placed on top of the layer of ferrite material 18. In some embodiments, RF transducers 24, 26 may be lines on a circuit board and the layer of ferrite material 18 may be placed on the circuit board such that the layer of ferrite material 18 is on top (e.g., touching) RF transducers 24, 26.

A first end of each transducer may be coupled to ground plane 14 and a second end of each transducer may be coupled to one of ports 20, 22. In the example illustrated in FIG. 1(*a*), the ends of RF transducers 24, 26 are coupled to respective ones of ground plane 14 and to ports 20, 22 via respective bond wires 28. Other techniques (including but not limited to conductive ribbons, ground vias) may of course also or alternatively be used to couple the ends of RF transducers 24, 26 to respective ones of ground plane 14 and ports 20, 22.

In some embodiments, an in-plane magnetic biasing field (H) having a direction parallel to the direction of transducers 24, 26 may be applied to MSW device 10. Such a magnetic biasing field may provide a magnetic bias configuration suitable for generating magnetostatic waves, such as magnetostatic surface waves (MSSW). The biasing field (H) may have a magnitude selected to saturate the ferrite and overcome any demagnetization and/or ferrite magnetic anisotropy factors, while also providing an internal magnetic field suitable for a desired frequency range of MSW device 10.

FIG. 1(*a*) merely illustrates one example of a MSW device, consistent with the embodiments disclosed herein. The disclosure is not so limited. For example, one would recognize that the thickness of layer 16 (e.g., GGG layer), the thickness of the layer of ferrite material 18 (e.g., YIG layer), the footprint of the YIG film, the type of transducers, the magnetic bias magnitude, etc. may be varied to meet the needs of a particular application. The disclosure herein broadly encompasses these different implementations, and is not limited to the example of FIG. 1(*a*).

FIG. 1(*b*) is a top view of an of an example printed circuit board (PCB) (referred to herein as PCB1) with components mounted thereon (PCB1 assembly 100), consistent with embodiments of the present disclosure. PCB 130 may be made of any type of material commonly used in PCB fabrication, such as fluorinated ethylene propylene (FEP), polytetrafluoroethylene (PTFE), ceramic, hydrocarbons, glass fiber, or flame retardant level 4 (FR-4). In some embodiments, the PCB may be single sided (e.g., printed with transmission lines and/or mounted with components on only one side) or double sided (e.g., printed with transmission lines and/or mounted with components on both sides). In some embodiments, the PCB may be multilayered, with transmission lines and/or components in one or more middle layers of the PCB. As shown in FIG. 1(*b*), via holes may connect different sides of the PCB.

As shown in FIG. 1(*b*), PCB 130 may have one or more RF connectors 145, 150 mounted onto it. PCB 130 may also have a quad flat no leads (QFN) package 110 mounted on it. PCB 130 may further have a ferrite material mounted onto it (e.g., ferrite material shown on top of MSW device 120). For example, the ferrite material may include a yttrium iron garnet (YIG) ferrite, a ferrite doped with calcium, a ferrite doped with gadolinium, a ferrite doped with vanadium, a ferrite doped with aluminum, or any other type of ferrite. A MSW device 120, such as an integrated circuit (IC), may be mounted on the QFN package 110 and coupled to PCB 130 through QFN package 110. MSW device 120 may be a MSW device having a doped ferrite and RF transducers (see, e.g., MSW device 10 of FIG. 1(*a*)). MSW device 120 may be coupled to QFN package through RF transducers (see, e.g., RF transducers 24, 26 of MSW device 10 of FIG. 1(*a*)). As shown in FIG. 1(*b*), MSW device 120 may be coupled to one or more RF connectors 145, 150 via one or more transmission lines 165, 170, 175, 180. The transmission lines may, for example, be microstrip transmission lines, coplanar waveguide transmission lines, stripline transmission lines, or any other known type of transmission line used for RF communication. PCB 130 may also have additional impedance matching components mounted thereon, such as components 135, 140, 155, 160 (e.g., capacitors or capacitive elements; or inductors or inductive elements; or resistors or resistive elements; or any combination thereof which provides a desired RF impedance characteristic or a desired RF impedance characteristic between the MSW device and respective ones of RF connectors 145, 150).

In some embodiments, MSW device 120 may include a pair of RF transducers (see, e.g., RF transducers 24, 26 of MSW device 10 of FIG. 1(*a*)) for coupling electromagnetic energy into and out of the ferrite. The transducers of MSW device 120 may receive electromagnetic energy from RF connectors 145, 150, couple the electromagnetic energy into the ferrite, and couple the electromagnetic energy out of the ferrite.

In operation, RF energy may enter PCB1 assembly 100 through one of RF connectors 145, 150. The RF energy may then travel along a path (e.g., along a transmission line) on PCB 130 to MSW device 120. The RF energy may then travel to one of RF transducers (e.g., one of transducers 24, 26 of FIG. 1(*a*)) on a layer of ferrite material 18 (see, e.g., layer of ferrite material 18 of FIG. 1(*a*)). The RF energy may then travel from the RF transducer through the layer of ferrite material (e.g., carried by magnetostatic waves (MSW) within the layer of ferrite material) to the other one of the RF transducers (e.g., the other one of transducers 24, 26 of FIG. 1(*a*)). The RF energy may then travel from that other RF transducer along a path (e.g., transmission line) on PCB 130 to the other RF connector (e.g., the other one of RF connectors 145, 150).

FIG. 1(*b*) merely illustrates one example of a PCB board and components, consistent with the embodiments disclosed herein. The disclosure is not so limited. One would recognize that any number of different PCBs, having any number of different shapes, configurations, and mounted components, may be used instead of the example shown in FIG. 1(*b*). The disclosure herein broadly encompasses these different implementations, and is not limited to the example of FIG. 1(*b*).

Figure 2:
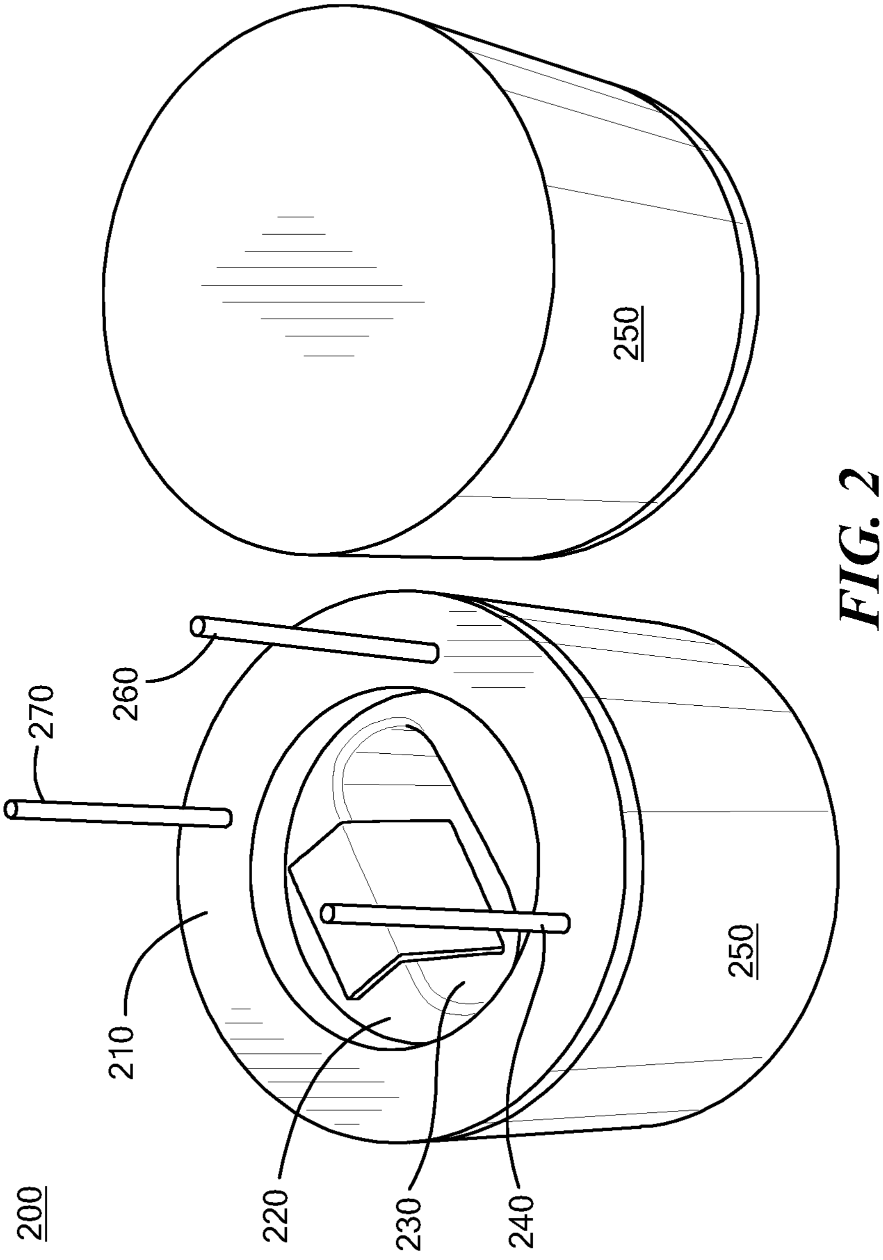
FIG. 2 includes a top view and a bottom view of an example temperature controllable enclosure, in accordance with some embodiments.

FIG. 2 includes a top and bottom view of an example temperature controllable enclosure 200, in accordance with some embodiments. In the example of FIG. 2, temperature controllable enclosure 200 is a mini oven used to apply heat. However, the disclosure is not so limited. Any type of temperature controllable enclosure may be used. For example, the temperature controllable enclosure may comprise any type of oven. Alternatively, temperature controllable enclosure 200 may comprise a thermoelectric cooler designed to apply cold. In some embodiments, a temperature controllable enclosure may be capable of providing heat and cold. In the example of FIG. 2, the left view shows a bottom view of a mini oven and the right view shows a top view of the mini oven. The mini oven may include outer surfaces 210, 250. The outer surfaces may be made of plastic, for example. Inside, the mini oven may have an interior surface 220 designed to get hot (or in the case of a cooling temperature controllable enclosure, an interior designed to get cold). For example, the mini oven may include an interior surface 220 made of metal, or ceramic, or some other material that is thermally conductive. The interior surface 220 may have an opening, access point or hole 230 in which a PCB, electrical components, materials, and/or devices may be inserted. For example, any PCB, components, materials, and/or devices desired to be temperature controlled may be inserted into interior surface 220. Electrical leads 240, 260, 270 may provide for powering and control of the temperature controllable enclosure. For example, one electrical lead may provide a voltage for powering the temperature controllable enclosure, another electrical lead may provide a ground, and the third electrical lead may provide for user control of the temperature controllable enclosure. The third electrical lead may, for example, be a data input, a potentiometer adjustable input, or an input using any other known way of providing for user adjustment of a component.

In some embodiments, temperature controllable enclosure 200 may include heating elements, such as resistive heating elements, though any known type of heating element may be used. In some embodiments, temperature controllable enclosure 200 may include a temperature sensing device, such as a thermocouple, to monitor the temperature within temperature controllable enclosure 200 to determine whether temperature controllable enclosure 200 is at a desired temperature.

In some embodiments, temperature controllable enclosure 200 may be any type of temperature controllable enclosure including, but not limited to, a commercially available ("off-the-shelf") mini oven (e.g., such as those used to temperature stabilize crystal oscillators) or an enclosure together with a temperature-controlled heater capable of providing sufficient heat and/or temperature control. For example, a metal or plastic box or other enclosure along with one or more heaters (e.g., resistive heaters) and a temperature sensing device such as a thermocouple may be used. Temperature controllable enclosure 200 may alternatively be a commercially available cooling device, such as a thermoelectric cooler or metal or plastic box or other enclosure along with one or more thermoelectric coolers and a temperature sensing device such as a thermocouple. Insulating such a box or other enclosure would help improve the temperature stability and reduce the power required for operating any associated heater/cooler. Any such temperature-controlled enclosures may be commercially available or specially designed for a particular application.

In some embodiments, a temperature controllable enclosure which rapidly heats or cools to a desired temperature (e.g., within about 60 second or less) and which is stable to less than about +/−one (1) degree may be used. In other embodiments, temperature-controlled enclosures having different characteristics may be used. The characteristics of the temperature-controlled enclosure (e.g., heating/cooling capability (rapid or slow)), temperature stability, size, may be selected to suit the needs of the particular application. After reading the disclosure provided herein, one of ordinary skill in the art will know how to select a temperature-controlled enclosure having characteristics to suit the needs of a particular application.

FIG. 2 merely illustrates one example of a temperature controllable enclosure, consistent with the embodiments disclosed herein. The disclosure is not so limited. One would recognize that any number of temperature controllable enclosures, having any number of different shapes and configurations, may be used instead of the example shown in FIG. 2. For example, the temperature controllable enclosure could be a thermoelectric cooler that provides cooling, rather than heat. The temperature controllable enclosure could be a component that provides the ability to heat or cool. The disclosure herein broadly encompasses these different implementations, and is not limited to the example of FIG. 2.

Figure 3:
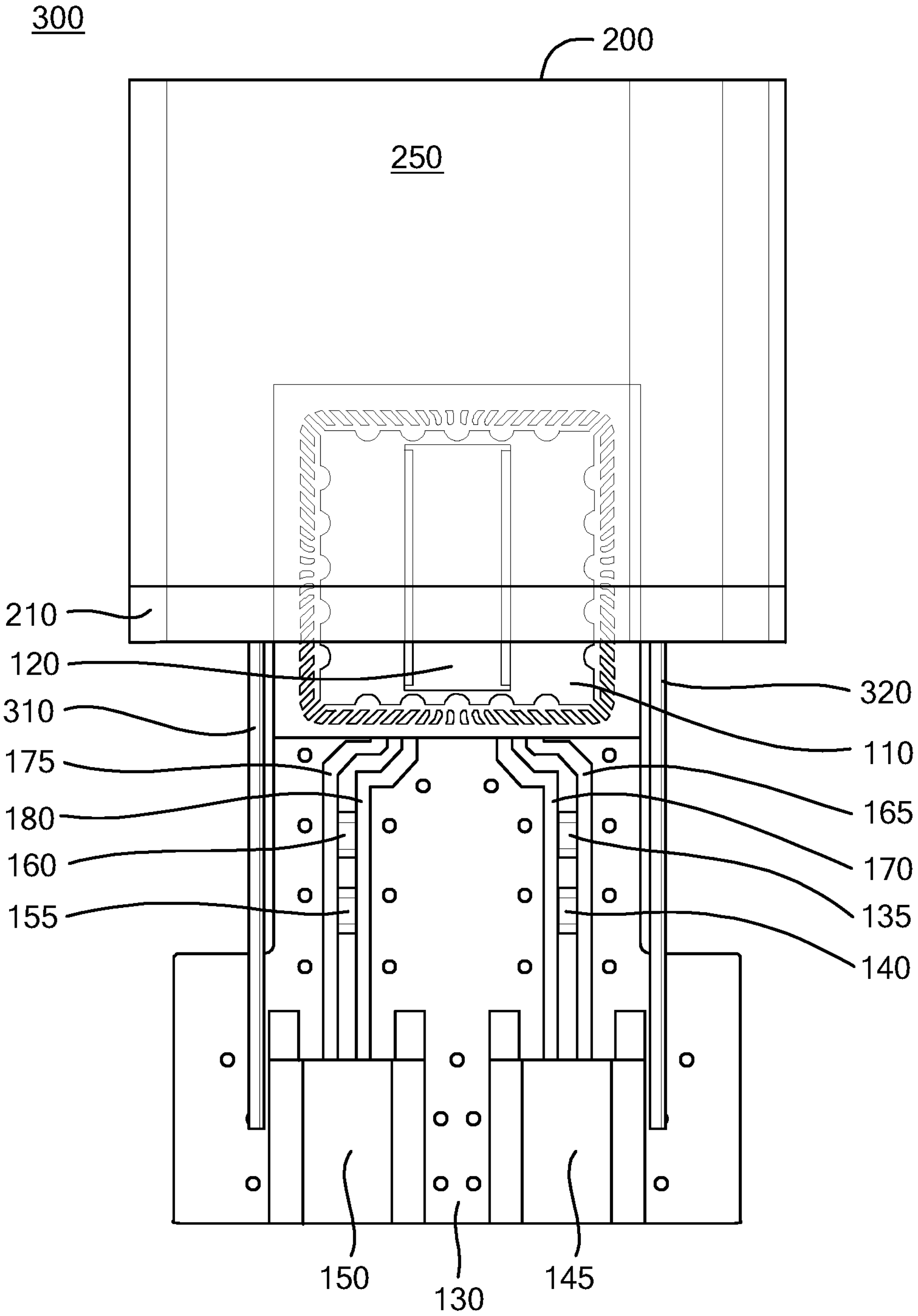
FIG. 3 is a top view of an example printed circuit board (e.g., PCB1 of FIG. 1) partially inserted into an example temperature controllable enclosure (e.g., the temperature controllable enclosures of FIG. 2), in accordance with some embodiments.

FIG. 3 is a top view of an example MSW RF apparatus 300. Example MSW RF apparatus 300 includes a printed circuit board assembly (e.g., PCB1 assembly 100 of FIG. 1(*b*)) partially inserted into an example temperature controllable enclosure (e.g., temperature controllable enclosure 200 of FIG. 2), in accordance with some embodiments. Temperature controllable enclosure 200 is illustrated with some transparency in FIG. 3 to show how PCB1 assembly 100 is inserted into temperature controllable enclosure 200. Referring back to FIG. 1(*b*), PCB1 assembly 100 may be designed for use with a temperature controllable enclosure 200. For example, as shown in FIG. 1(*b*), the upper portion of PCB1 assembly 100 may be relatively narrow. In some embodiments, the upper portion of PCB1 assembly 100 may be no wider than a quad flat no-lead (QFN) package, so that it can fit into a space of a temperature controllable enclosure (e.g., hole 230 of temperature controllable enclosure 200).

In some embodiments, MSW device 120 of PCB1 assembly 100 may configure PCB1 assembly 100 to act as a frequency selective limiter (FSL). By placing MSW device 120 and its ferrite in a temperature controllable enclosure 200 (e.g., a mini-oven) and appropriately controlling the temperature of the temperature controllable enclosure 200, characteristics of the ferrite and an associated operating frequency of the FSL may be controlled. For example, after placing MSW device 120 and its ferrite in a mini-oven and appropriately controlling the temperature of the oven, the FSL may be capable of operation in the VHF band and lower portions of the UHF band. In embodiments, the FSL may be capable of operation in a frequency range of about 225 MHz to about 400 MHz. It should be appreciated that although this example relates to an FSL that operates from about 225 MHz to about 400 MHz, a temperature controlled FSL could operate at a lower or higher frequency if a different temperature is chosen or if a different ferrite is used. In general, the lowest frequency of operation depends upon a variety of factors including, but not limited to, ferrite composition (e.g., dopant characteristics of the ferrite such as how highly doped the ferrite is and what the ferrite is doped with), how thin/thick the ferrite layer is, the temperature, and even the shape of the ferrite layer. In some embodiments, operation below 100 MHz may be achieved.

In the example shown in FIG. 3, PCB1 assembly 100 is partially inserted into a temperature controllable enclosure 200 (e.g., mini oven). As discussed above with respect to FIG. 2, temperature controllable enclosure 200 may have three leads, one for power, one for temperature setpoint, and one for ground. Two of the leads 310, 320 are visible in FIG. 3.

Figure 4:
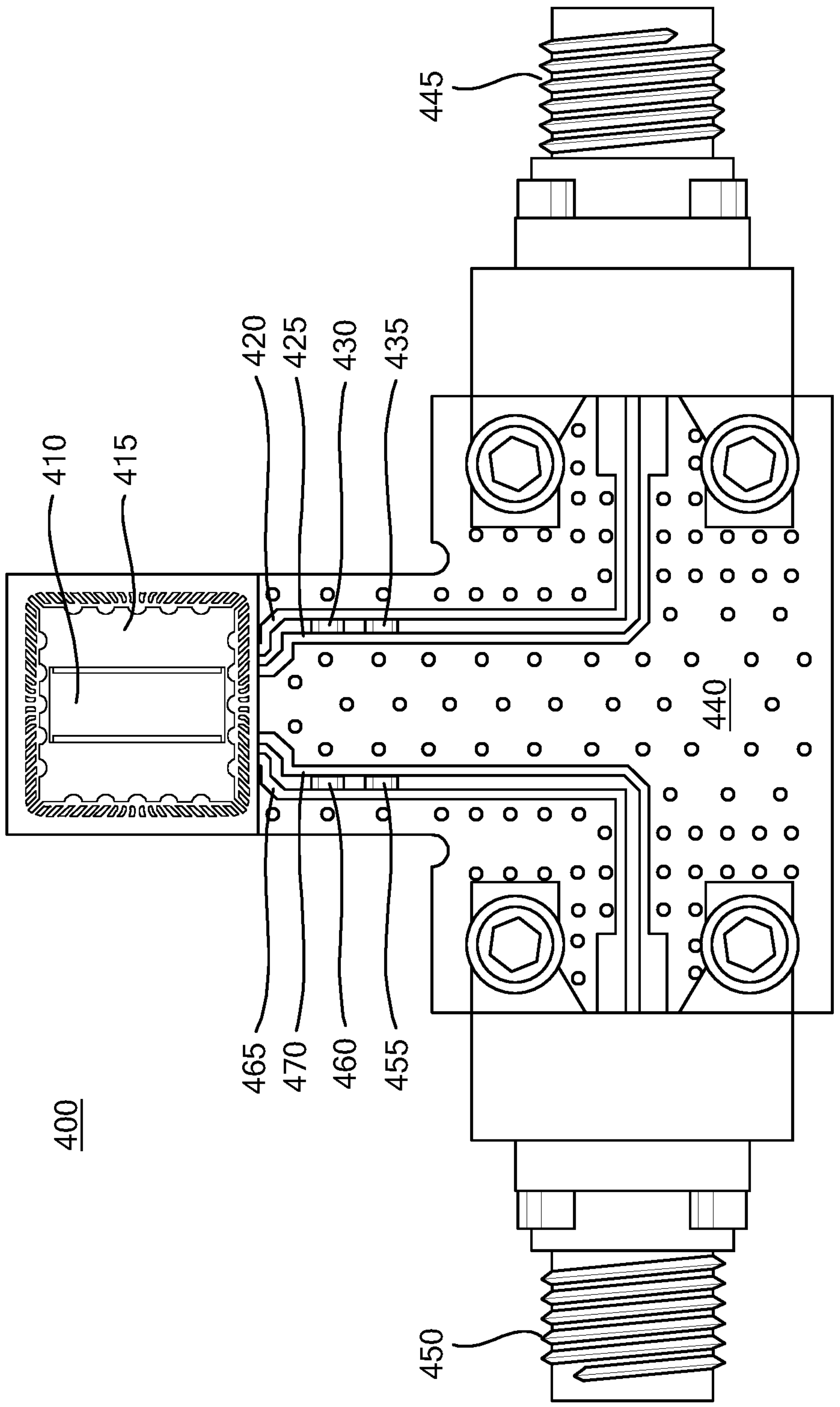
FIG. 4 is a top view of another example printed circuit board (PCB2) with components mounted thereon, in accordance with some embodiments.

FIG. 4 is a top view of another example printed circuit board (PCB2) with components mounted thereon (PCB2 assembly 400), in accordance with some embodiments.

The PCB 440 may be made of any type of material commonly used in PCB fabrication, such as fluorinated ethylene propylene (FEP), polytetrafluoroethylene (PTFE), ceramic, hydrocarbons, glass fiber, or flame retardant level 4 (FR-4). In some embodiments, the PCB may be single sided (e.g., printed with transmission lines and/or mounted with components on only one side) or double sided (e.g., printed with transmission lines and/or mounted with components on both sides). In some embodiments, the PCB may be multilayered, with transmission lines and/or components in one or more middle layers of the PCB. As shown in FIG. 4, via holes may connect different sides of the PCB.

As shown in FIG. 4, PCB 440 may have one or more RF connectors 445, 450 (e.g., SubMiniature version A (SMA) connectors) mounted onto it. PCB 440 may also have a QFN package 415 mounted on it. PCB 440 may further have a ferrite material (e.g., ferrite on top of MSW device 410) mounted onto it. For example, the ferrite material may include a yttrium iron garnet (YIG) ferrite, a ferrite doped with calcium, a ferrite doped with vanadium, a ferrite doped with aluminum, a ferrite doped with gadolinium, or any other type of ferrite. A MSW device 410, such as an integrated circuit (IC) may be coupled to QFN package 415. MSW device 410 may comprise a layer of the ferrite material and RF transducers (see, e.g., MSW device 10 of FIG. 1(*a*)). MSW device 410 may be coupled to PCB 440 through QFN package 415 via RF transducers (see, e.g., RF transducers 24, 26 of MSW device 10 of FIG. 1(*a*)). As shown in FIG. 4, MSW device 410 may be coupled to one or more RF connectors 445, 450 via one or more transmission lines 420, 425, 465, 470. The transmission lines may be, for example, microstrip transmission lines, coplanar waveguide transmission lines, stripline transmission lines, or any other known type of transmission line used for RF communication. PCB 440 may also have additional impedance matching components mounted thereon, such as components 425, 430, 455, 460 (e.g., capacitors or capacitive elements; or inductors or inductive elements; or resistors or resistive elements; or any combination thereof which provides a desired RF impedance characteristic or a desired RF impedance characteristic between the MSW device and respective ones of the RF connectors 445, 450).

In some embodiments, MSW device 410 may include a pair of RF transducers (see, e.g., RF transducers 24, 26 of MSW device 10 of FIG. 1(*a*)) for coupling electromagnetic energy into and out of the ferrite. The transducers of the MSW device 410 may receive electromagnetic energy from one or more RF connectors 445, 450, couple the electromagnetic energy into the ferrite, and couple the electromagnetic energy out of the ferrite.

In operation, RF energy may enter PCB2 assembly 400 through one of RF connectors 445, 450. The RF energy may then travel along a path (e.g., along a transmission line) on PCB 440 to MSW device 410. The RF energy may then travel to one of RF transducers (e.g., one of transducers 24, 26 of FIG. 1(*a*)) on a layer of ferrite material (e.g., layer of ferrite material 18 of FIG. 1(*a*)). The RF energy may then travel from the RF transducer through the layer of ferrite material (e.g., carried by magnetostatic waves (MSW) within the layer of ferrite material) to the other one of the RF transducers (e.g., the other one of transducers 24, 26 of FIG. 1(*a*)). The RF energy may then travel from that other RF transducer along a path (e.g., transmission line) on PCB 440 to the other RF connector (e.g., the other one of RF connectors 445, 450).

PCB2 assembly 400 may be designed for use with a temperature controllable enclosure 250. For example, the upper portion of PCB2 assembly 400 may be relatively narrow. In some embodiments, the upper portion of PCB2 assembly 400 may be no wider than QFN package 415, so that it can fit into a space of a temperature controllable enclosure (e.g., hole 230 of temperature controllable enclosure 200 of FIG. 2). In the example shown in FIG. 4, the QFN package may be 9 mm wide.

FIG. 4 merely illustrates one example of a PCB and components, consistent with the embodiments disclosed herein. The disclosure is not so limited. One would recognize that any number of different types of PCBs, having any number of different shapes, configurations, and mounted components, may be used instead of the example shown in FIG. 4. The disclosure herein broadly encompasses these different implementations, and is not limited to the example of FIG. 4.

Figure 5:
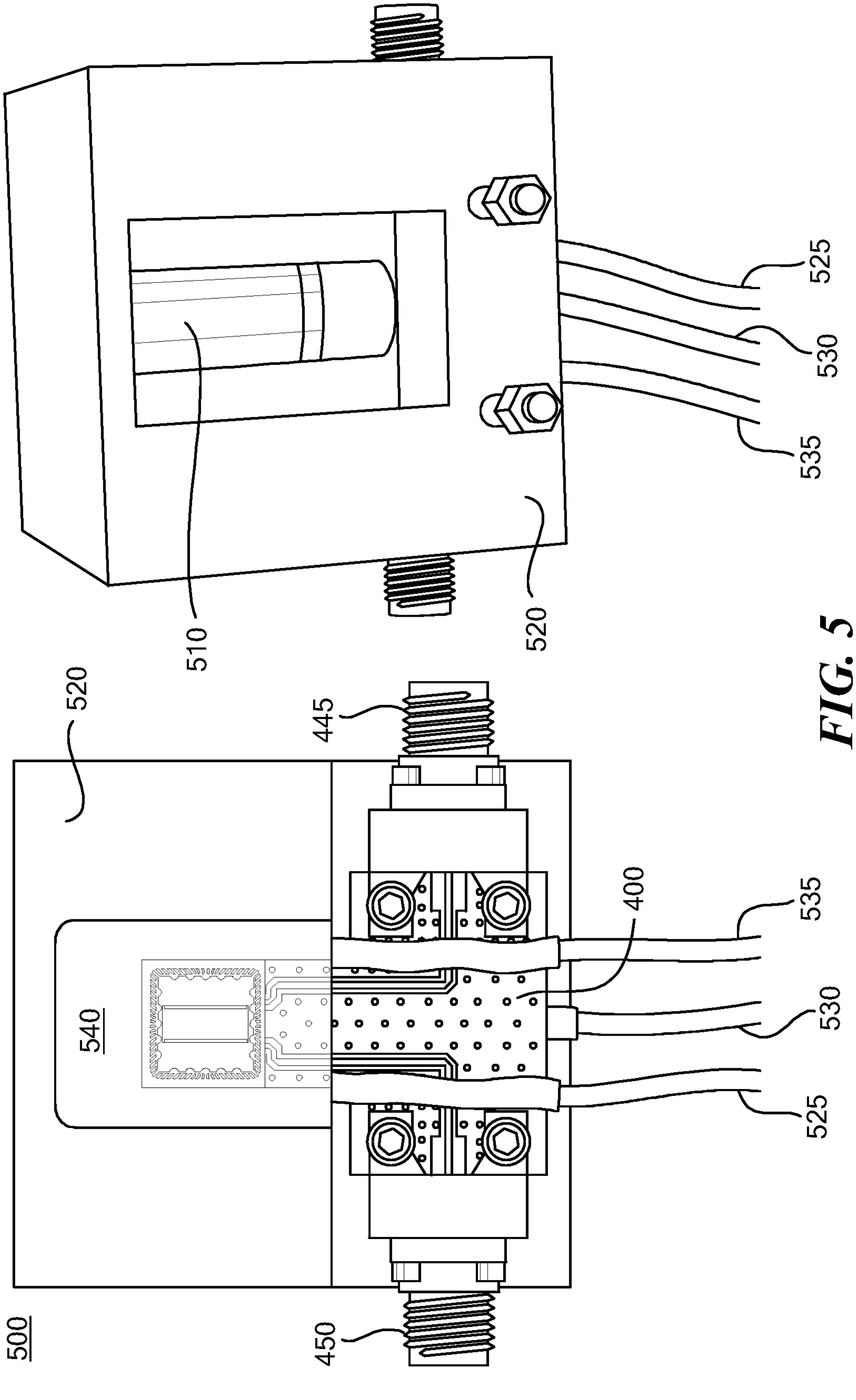
FIG. 5 includes a top view and a bottom view of an example magnetostatic (MSW) radio frequency (RF) apparatus, in accordance with some embodiments.

FIG. 5 includes a bottom view (left) and top view (right) of an example magnetostatic (MSW) radio frequency (RF) apparatus 500, in accordance with some embodiments. In some embodiments, a portion of a PCB assembly, such as PCB2 assembly 400 or PCB1 assembly 100, is inserted into a temperature controllable enclosure (e.g., temperature controllable enclosure 200 of FIG. 2). One or more biasing magnets (e.g., permanent magnets) may also be disposed inside, on, or about (e.g., in proximity to) the temperature controllable enclosure. The one or more biasing magnets may be used to apply a magnetic bias to the ferrite in the PCB assembly. For example, the one or more biasing magnets may bias the ferrite for propagation of MSW RF signals, such as magnetostatic surface waves (MSSW), forward magnetostatic volume waves (FVMSW), backward volume magnetostatic waves (BVMSW), or a combination thereof. For magnetostatic surface waves, the magnetic bias field may be in the plane of the ferrite film (or substantially in the plane of the ferrite film) and parallel (or substantially parallel) to two RF transducers. The two RF transducers may be patterned or otherwise provided on a surface (e.g., a top surface) of the ferrite film. In some embodiments, a structure may hold the PCB assembly, temperature controllable enclosure, and/or one or more biasing magnets together.

In the example of FIG. 5, MSW RF apparatus 500 includes PCB2 assembly 400 of FIG. 4. As shown in FIG. 5, PCB2 assembly 400 has been inserted into a hole 540 of a temperature controllable enclosure 510. In some embodiments, temperature controllable enclosure 510 may be temperature controllable enclosure 250 of FIG. 2. Leads 525, 530, 535 may provide power and control to temperature controllable enclosure 510. For example, one of leads 525, 530, 535 may provide a voltage source to temperature controllable enclosure 510, one of leads 525, 530, 535 may provide a ground source to temperature controllable enclosure 510, and one of leads 525, 530, 535 may provide a temperature setpoint control to temperature controllable enclosure 510. One or more biasing magnets (e.g., permanent magnets) may provide a magnetic bias to the ferrite in PCB2 assembly 400. For example, one or more biasing magnets may bias the ferrite for propagation of MSW RF signals, such as magnetostatic surface waves (MSSW), forward volume magnetostatic waves (FVMSW), backward volume magnetostatic waves (BVMSW), or a combination thereof. For magnetostatic surface waves, the magnetic bias field may be in the plane of the ferrite film (or substantially in the plane of the ferrite film) and parallel (or substantially parallel) to two RF transducers. The two RF transducers may be patterned or otherwise provided on a surface (e.g., a top surface) of the ferrite film The one or more biasing magnets may be disposed inside temperature controllable enclosure 510, on temperature controllable enclosure 510, near temperature controllable enclosure 510, or outside temperature controllable enclosure 510. In some embodiments, a structure 520 may hold PCB2 assembly 400, temperature controllable enclosure 520, and/or one or more biasing magnets, together. Structure 520 could be any suitable structure for holding the components together and could be made of plastic, rubber, metal, or any other rigid structure. In some embodiments, structure 520 could be 3-D printed. In some embodiments, structure 520 provides support and stability for the complete MSW RF apparatus assembly. In some embodiments, the one or more biasing magnets may be disposed between temperature controllable enclosure 510 and structure 520. For example, although not shown in FIG. 5, the one or more biasing magnets may be disposed between temperature controllable enclosure 510 and structure 520 such that the one or more biasing magnets can be seen through the hole through which temperature controllable enclosure 510 is visible in FIG. 5.

In some embodiments, a relatively weak bias magnetic field may be desired. In embodiments, a desired bias magnetic field may be provided by appropriately spacing one or more magnets from the ferrite to provide a low magnetic field that is stable over changes in ambient temperature. In some embodiments, a desired magnetic field may be provided by using a relatively weak magnet to provide a low magnetic field that is stable over changes in ambient temperature. In some embodiments, two magnets disposed in opposition to each other (e.g., magnets arranged with opposing polarities) may be used to provide a desired magnetic field (i.e., a low magnetic field that is stable over changes in ambient temperature). It should, however, be appreciated that any appropriate combination or configuration of one or more magnets may be used to provide a desired and appropriate magnetic field.

The MSW RF apparatus assembly of FIG. 5 may be a temperature-stabilized FSL. However, as noted above, the concepts described herein are not limited to providing FSLs. Rather, the concepts can be applied to providing signal-to-noise enhancers (SNE), delay lines, bandpass filters, bandstop filters, isolators, and combinations thereof capable of operation in the VHF and lower UHF frequency bands.

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein.

For example, as noted above, one could utilize a commercially available ("off-the-shelf") mini oven or thermoelectric cooler. Alternatively, one could substitute other types of enclosures together with a temperature-controlled heater or cooler capable of providing sufficient heating, cooling, and/or temperature control. For example, a metal or plastic box or other enclosure large enough to hold the MSW device along with one or more resistive heaters or thermoelectric coolers, and a temperature sensing device such as a thermocouple, could be substituted for the temperature controllable enclosures used in the example embodiments. Insulating the box would help improve the temperature stability and reduce the power required for operating the heater/cooler.

If the heater/cooler in the temperature controllable enclosure were made bigger, or the magnetic bias magnet(s) (e.g., permanent magnets) made smaller, then the magnetic bias magnet(s) that supply the magnetic bias field may be included in the thermally stable environment within the temperature controllable enclosure, allowing them to also be kept at a stable temperature. This may afford even greater stability in the device performance.

Some example embodiments described in this disclosure are directed toward an FSL that operates in the frequency range of about 225 MHz to about 400 MHz. A heated/cooled device or RF component could operate at a lower or higher frequency if a different temperature is chosen or a different ferrite film with a different saturation magnetization is used.

Although many examples herein refer to a heated temperature controllable enclosure, the disclosure is not so limited. Temperature-stabilized assemblies in which the temperature controllable enclosure includes a cooler instead of a heater is another example contemplated herein. Maintaining a reduced temperature of the film may increase the saturation magnetization of the ferrite film, allowing for higher frequencies of operation. In accordance with a further aspect of the techniques described herein, it has also been recognized that an operating frequency of a MSW device can be raised (i.e., increased) by increasing the applied bias magnetic field. However, saturation magnetization of a ferrite has an influence on the frequency bandwidth at which the apparatus can operate. Higher saturation magnetization may allow for a broader frequency bandwidth of operation which, in at least some embodiments/applications may be preferred. Lowering the temperature of a ferrite (e.g., YIG) may increase the saturation magnetization of the ferrite, which may result in a MSW device having broader or increased bandwidth (e.g., compared with a bandwidth of a MSW device for which the temperature of the same ferrite has not been lowered). Also, cooling the ferrite (e.g., lowering the temperature of the ferrite) may allow a MSW device to operate at higher powers since the heat from the device is being actively removed by the cooling.

A temperature-stabilized assembly operating at an elevated temperature may also be used for a higher frequency MSW device. In that case, the elevated temperatures may not be required for reaching the desired frequency of operation, but the assembly may still provide a stable temperature so that the device performance may not change with a variation in the ambient temperature.

Further, it is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A magnetostatic wave (MSW) radio frequency (RF) apparatus comprising:

a MSW device comprising a ferrite having a saturation magnetization characteristic and a pair of RF transducers that couple electromagnetic energy into and out of the ferrite;

a biasing magnet disposed to apply a magnetic bias to the ferrite for propagation of magnetostatic surface waves (MSSW), forward volume magnetostatic waves (FVMSW), backward volume magnetostatic waves (BVMSW), or a combination thereof; and a temperature controllable enclosure used to apply a temperature, thereby changing the saturation magnetization characteristic of the ferrite and an associated operating frequency of the MSW RF apparatus.

2. The MSW RF apparatus of claim 1, wherein the ferrite comprises a chemically applied dopant and wherein the dopant is of a sufficient amount to change the saturation magnetization characteristic of the ferrite.

3. The MSW RF apparatus of claim 1, wherein the ferrite comprises yttrium iron garnet (YIG).

4. The MSW RF apparatus of claim 2, wherein the dopant comprises at least one of calcium, vanadium, or aluminum, and wherein the dopant is of a sufficient amount to change the saturation magnetization characteristic of the ferrite.

5. The MSW RF apparatus of claim 2, wherein the dopant is gadolinium.

6. The MSW RF apparatus of claim 1, wherein the temperature controllable enclosure is configured to increase temperature from an ambient temperature, thereby lowering a saturation magnetization characteristic of the ferrite and lowering an associated operating frequency of the MSW RF apparatus.

7. The MSW RF apparatus of claim 1, wherein the temperature controllable enclosure is configured to decrease temperature from an ambient temperature, thereby raising a saturation magnetization characteristic of the ferrite and raising an associated operating frequency of the MSW RF apparatus.

8. The MSW RF apparatus of claim 1, wherein the MSW RF apparatus is configured to function as at least one of: a frequency selective limiter (FSL); a signal-to-noise enhancer (SNE); a delay line; a bandpass filter; a bandstop filter; or an isolator.

9. The MSW RF apparatus of claim 1, wherein the temperature controllable enclosure is configured to provide a constant temperature over a range of ambient temperatures.

10. The MSW RF apparatus of claim 1, wherein the biasing magnet remains at a substantially constant temperature and provides a substantially constant magnetic bias field over a range of ambient temperatures.

11. The MSW RF apparatus of claim 10, wherein the biasing magnet is disposed inside the temperature controllable enclosure.

12. The MSW RF apparatus of claim 10, wherein the biasing magnet is disposed outside the temperature controllable enclosure.

13. The MSW RF apparatus of claim 10, wherein the biasing magnet is disposed on one or more surfaces of the temperature controllable enclosure.

14. The MSW RF apparatus of claim 1, wherein the temperature controllable enclosure comprises a mini-oven.

15. The MSW RF apparatus of claim 1, wherein the temperature controllable enclosure comprises a thermoelectric cooler.

16. A magnetostatic wave (MSW) radio frequency (RF) apparatus comprising:

a MSW device comprising a ferrite having a saturation magnetization characteristic and a pair of RF transducers that couple electromagnetic energy into and out of the ferrite;

a biasing magnet disposed to apply a magnetic bias to the ferrite for propagation of magnetostatic surface waves (MSSW), forward volume magnetostatic waves (FVMSW), backward volume magnetostatic waves (BVMSW), or a combination thereof; and a temperature controllable enclosure used to increase temperature from an ambient temperature, thereby changing the saturation magnetization characteristic of the ferrite and an associated operating frequency of the MSW RF apparatus.

17. The MSW RF apparatus of claim 16, wherein the ferrite comprises yttrium iron garnet (YIG).

18. The MSW RF apparatus of claim 17, wherein the ferrite comprises a chemically applied dopant, wherein the dopant is of a sufficient amount to change the the saturation magnetization characteristic of the ferrite, and wherein the dopant comprises at least one of calcium, vanadium, gadolinium, or aluminum.

19. The MSW RF apparatus of claim 18, wherein the MSW RF apparatus operates at frequencies of about 225 MHz to about 400 MHz.

20. The MSW RF apparatus of claim 19, wherein the temperature controllable enclosure comprises a mini-oven.

* * * * *